(12) United States Patent
Li et al.

(10) Patent No.: US 9,778,517 B2
(45) Date of Patent: Oct. 3, 2017

(54) ARRAY SUBSTRATE, DISPLAY PANEL AND DISPLAY DEVICE (71) Applicants: Xiamen Tianma Micro-Electronics Co., Ltd., Xiamen (CN); Tianma Micro-Electronics Co., Ltd., Shenzhen (CN)

(72) Inventors: Jing Li, Xiamen (CN); Ting Zhou, Xiamen (CN); Boping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/802,998

(22) Filed: Jul. 17, 2015

(65) Prior Publication Data
US 2016/0216568 A1    Jul. 28, 2016

(30) Foreign Application Priority Data
Jan. 22, 2015    (CN) .......................... 2015 1 0032445

(51) Int. Cl.
*G02F 1/1343*    (2006.01)
*G02F 1/1335*    (2006.01)

(52) U.S. Cl.
CPC .. *G02F 1/134309* (2013.01); *G02F 1/133512* (2013.01); *G02F 1/134363* (2013.01);
(Continued)

(58) Field of Classification Search
CPC ................................................ G02F 1/134309
See application file for complete search history.

(56) References Cited

U.S. PATENT DOCUMENTS 5,247,289 A    9/1993 Matsueda
5,641,974 A *   6/1997 den Boer .......... G02F 1/136213
                                                    257/59
(Continued)

FOREIGN PATENT DOCUMENTS

CN    201788341 U    4/2011
CN    102629047      8/2012
(Continued)

OTHER PUBLICATIONS

Chinese Application No. 201510032445.2, First Office Action dated Apr. 1, 2017.

*Primary Examiner* — Peniel M Gumedzoe
*Assistant Examiner* — Christopher Johnson
(74) *Attorney, Agent, or Firm* — Alston & Bird LLP (57) ABSTRACT

An array substrate includes a substrate, a plurality of gate lines and a plurality of data lines intersecting the gate lines and insulated from the gate lines. The intersections of the gate lines and data lines define a plurality of pixel units, each of the pixel units comprise a first electrode and a second electrode laminated, with the second electrode having at least one branch electrode, and the first electrode having at least one first slit disposed between the pixel units and extending in a direction of the data lines. In the array substrate, the display panel and the display device, the electrode under the black matrix is removed by hollowing out to reduce the electric field strength under the black matrix.

9 Claims, 7 Drawing Sheets (52) U.S. Cl.
CPC ............ *G02F 2001/134372* (2013.01); *G02F 2201/121* (2013.01)

(56) References Cited

U.S. PATENT DOCUMENTS

| | | | |
|---|---|---|---|
| 2010/0149078 A1* | 6/2010 | Kim | H01L 51/524 345/80 |
| 2012/0050643 A1* | 3/2012 | Li | H01L 27/12 349/61 |
| 2012/0320320 A1 | 12/2012 | Chen et al. | |
| 2013/0093989 A1 | 4/2013 | Shao et al. | |
| 2015/0168760 A1* | 6/2015 | Sugiyama | G02F 1/13306 349/42 |
| 2016/0018709 A1* | 1/2016 | Jeong | G02F 1/136213 349/38 |
| 2016/0266445 A1 | 9/2016 | Wang et al. | |

FOREIGN PATENT DOCUMENTS

| | | |
|---|---|---|
| CN | 103345096 | 10/2013 |
| CN | 104280963 | 1/2015 |
| KR | 20110064168 A | 6/2011 |

\* cited by examiner

ARRAY SUBSTRATE, DISPLAY PANEL AND DISPLAY DEVICE

CROSS-REFERENCES TO RELATED APPLICATIONS

This application claims priority to Chinese patent application No. 201510032445.2, filed on Jan. 22, 2015, the content of which is incorporated herein by reference in its entirety.

BACKGROUND OF THE INVENTION

Currently, a display panel, such as a thin film transistor-liquid crystal display (TFT-LCD), an organic light emitting diode display (OLED), a low temperature poly-silicon (LTPS) display or a plasma display panel (PDP), is widely used in a portable electronic product such as a mobile phone and a personal digital assistant (PDA). A display device which is more portable and much cheaper and has a better display effect is becoming more and more popular, under the impetus of market competition.

In a display device, an electronic field formed between a pixel electrode and a common electrode drives liquid crystal molecules to rotate to display an image. In the case where the display panel has a relatively low resolution, the pixel electrode is relatively far from a black matrix and the electric field strength under the black matrix is weak, thus liquid crystal molecules are rotated to a smaller extent, the transmittance in any oblique direction is lower and the compression induced color shift is less prone to happen. To meet the increasing demand of a high-resolution product, and generate a relatively high transmittance in the layer normal direction, the distance between the pixel electrode and the black matrix is made smaller and smaller, and then the electric field strength under the black matrix becomes stronger, thereby the extent to which liquid crystal molecules are rotated is increased, the transmittance in any oblique direction is increased and the possibility of color blending shift is increased. In a conventional high-resolution product, the size of the pixel is made increasingly smaller, the distance between the pixel electrode and the black matrix is made increasingly smaller, and the product dimension gets bigger and thinner, then it is prone to have local alignment deviation caused by external force such as compression, which may cause color blending shift.

BRIEF DESCRIPTION OF THE DRAWINGS

In order to illustrate the technical solutions according to the embodiments of the present invention more clearly, drawings to be used in the description of the embodiments will be described briefly hereinafter. Apparently, the drawings described hereinafter are only exemplary embodiments of the present invention. Those skilled in the art will recognize that other embodiments can also be designed within the scope of the present invention.

DETAILED DESCRIPTION OF THE PREFERRED EMBODIMENTS

The technical solutions in the embodiments of the present invention will be described clearly and completely hereinafter in conjunction with the drawings in the embodiments of the present invention. Apparently, the described embodiments are only a part but not all of the embodiments of the present invention. Other embodiments can be obtained by those skilled in the art without departing the scope of the present invention.

Figure 1:
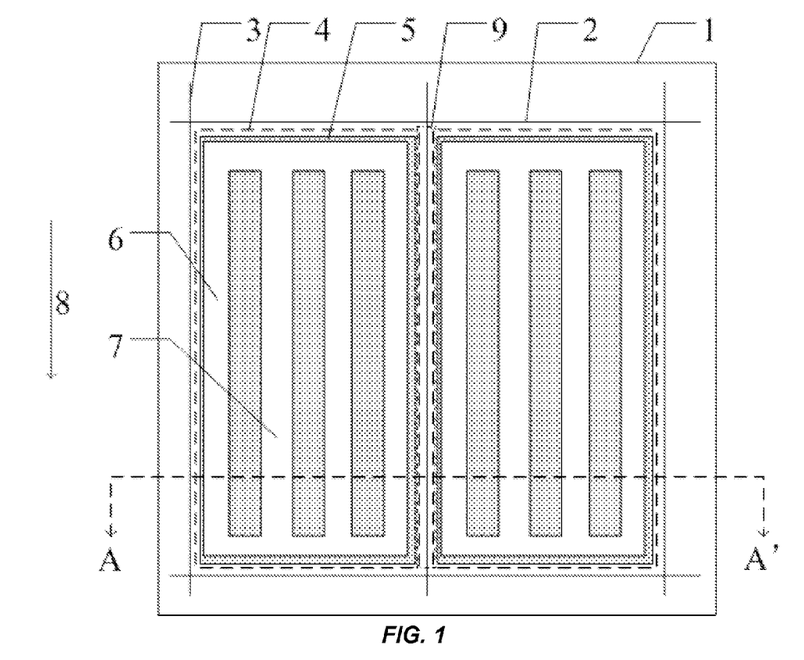
FIG. 1 is a simplified plan view of an array substrate according to an embodiment of the present invention.

Embodiments of the present disclosure provide an array substrate. Referring to FIG. 1, the array substrate includes a substrate 1 on which a plurality of gate lines 2 and a plurality of data lines 3 are provided, where the gate lines 2 and the data lines 3 intersect each other and are insulated from each other to define a plurality of pixel units 4, each of the plurality of pixel units 4 comprises a first electrode 5 and a second electrode 6 which are laminated, with the second electrode 6 having at least one branch electrode 7, and the first electrode 5 having at least one first slit 9 provided between the pixel units 4 and extending in a direction 8 of the data lines 3.

Figure 2:
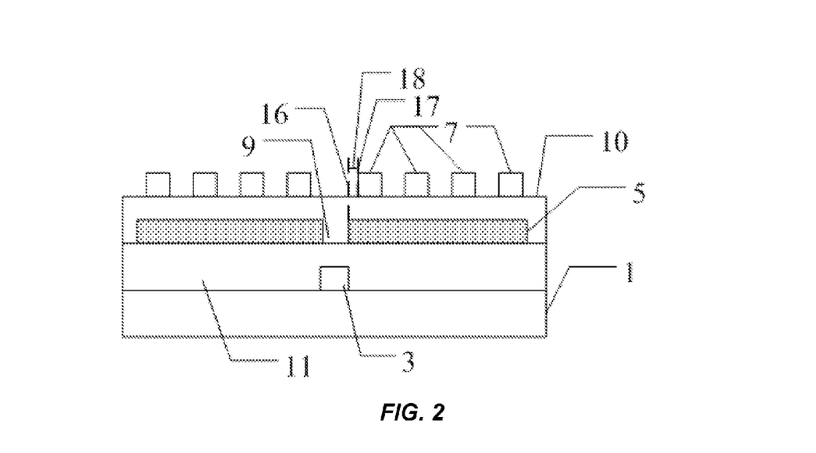
FIG. 2 is a simplified cross-sectional view taken along A-A' in FIG. 1.

FIG. 2 is a simplified cross-sectional view taken along A-A' in FIG. 1. As can be seen from FIG. 2, an insulation layer 10 is provided between the first electrode 5 and branch electrode 7 of the second electrode, and the first electrode is provided between the insulation layer and the substrate. The first electrode is a common electrode, and the second electrode is a pixel electrode. An insulation layer 11 is provided between the common electrode 5 and the data line 3. The data line 3 and a vertical projection area of the first slit 9 on the data line are at least partially overlapped.

Figure 3:
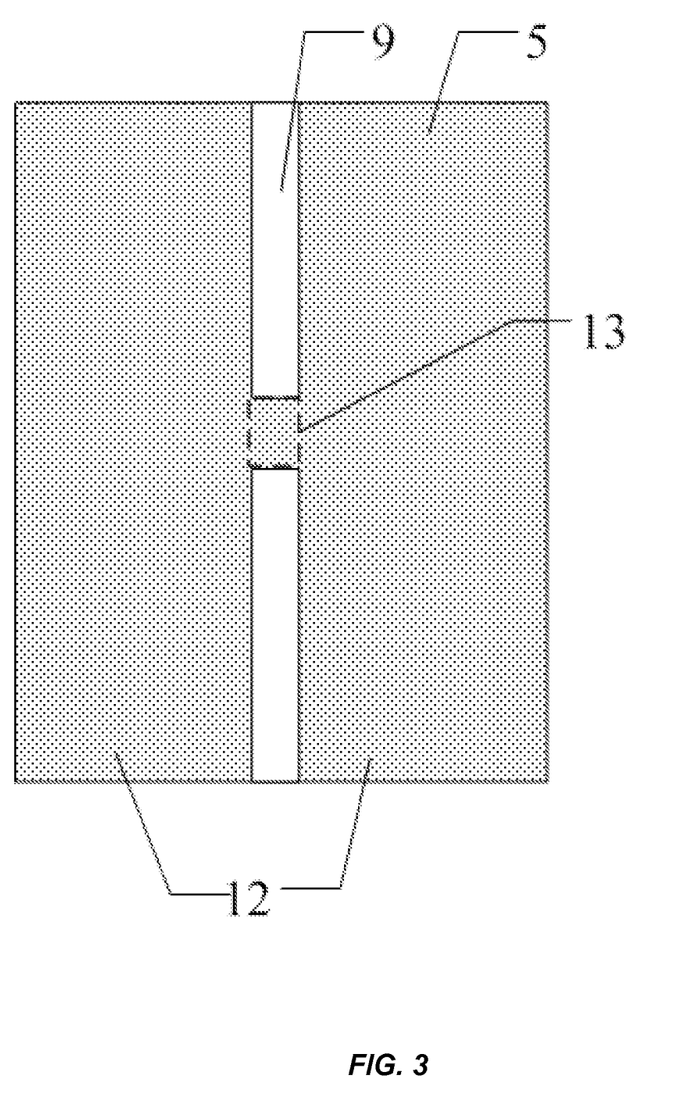
FIG. 3 is a plan view of a common electrode according to an embodiment of the present invention.
Figure 4:
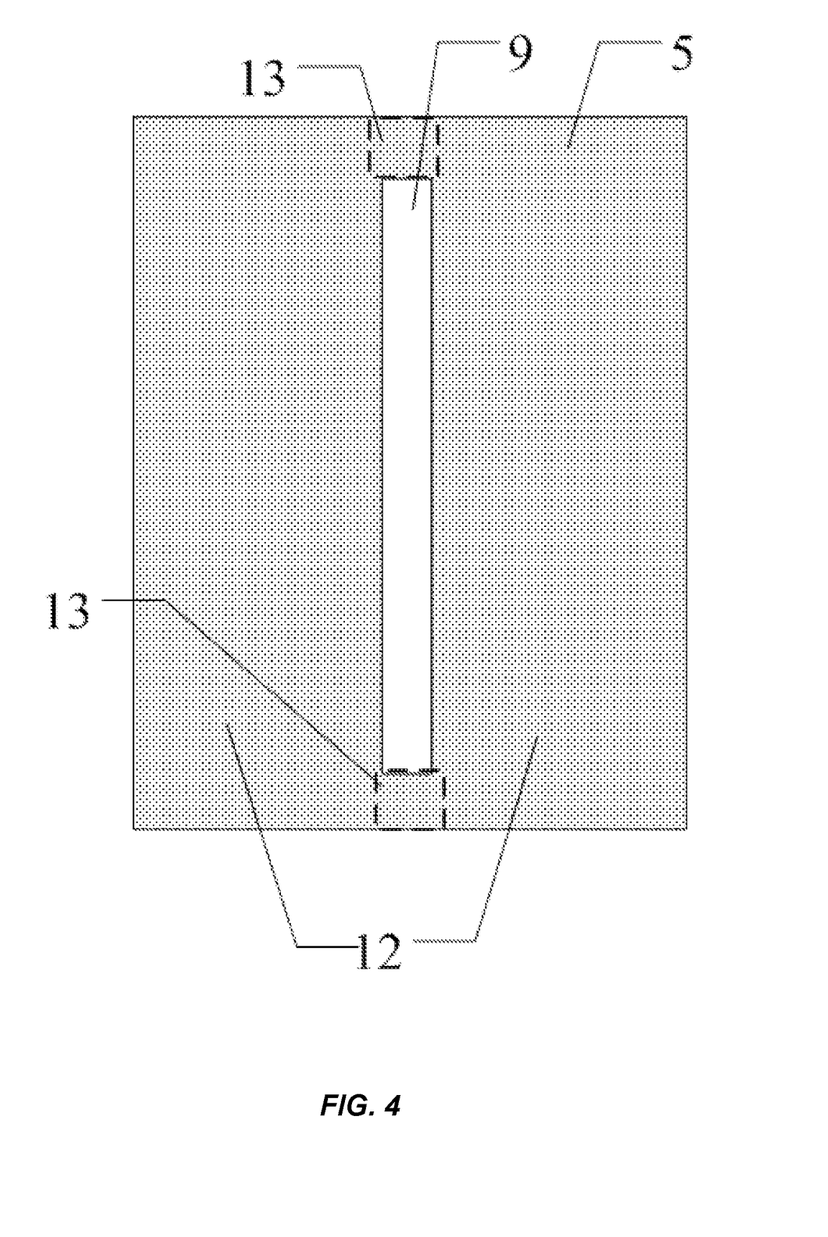
FIG. 4 is a plan view of a common electrode according to an embodiment of the present invention.

In an embodiment of the present disclosure, the common electrodes are connected as a whole, i.e., the common electrode may be formed by hollowing a conductive layer. The common electrode includes multiple body portions and a first connecting portion electrically connecting adjacent the body portions, with the first slit being provided between adjacent body portions. As shown in FIG. 3, the shaded area is the common electrode 5, where the common electrode 5 is connected as a whole, the first slit 9 is disposed on the common electrode 5, the common electrode 5 includes two body portion 12 and one first connecting portion 13 which is disposed between two adjacent body portions 12 and electronically connects the two adjacent body portions 12, and the first slit 9 is provided between the adjacent body portions 12. The above is only an exemplary embodiment of the present disclosure. Other embodiments of the present disclosure may also be implemented as follows. Two first connecting portions are provided between adjacent body portions of the common electrodes, with the two first connecting portions being located at two ends of the body portions respectively. As shown in FIG. 4, the shaded area is the common electrode 5, where the common electrode 5 is connected as a whole, the first slit 9 is provided on the common electrode 5; the common electrode 5 includes two body portions 12 and two first connecting portions 13 which are located at two distal ends of the body portions, respectively. The first connecting portion 13 is electronically connected to the body portion 12, and the first slit 9 is arranged between the body portions 12.

Figure 5:
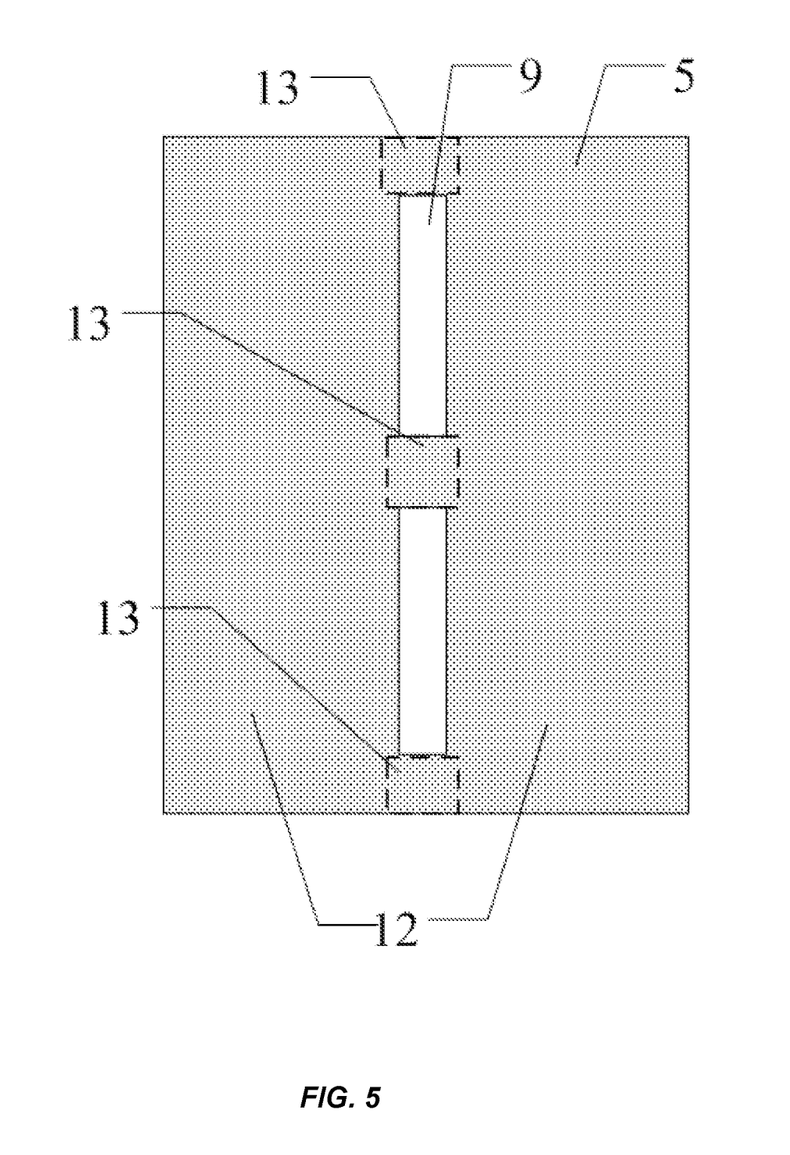
FIG. 5 is a plan view of a common electrode according to an embodiment of the present invention.

The above are only exemplary embodiments of the present disclosure. In an embodiment of the present disclosure, the common electrodes are connected as a whole, the common electrode may include the structure in the above-described implementations. That is, the common electrode includes two body portions and three first connecting portions which connect adjacent body portions, and the first slit is provided between adjacent body portions, where two first connecting portions are located at two ends of the body portions respectively. As shown in FIG. 5, the shaded area is the common electrode 5, where the common electrodes 5 are connected as a whole, the first slit 9 is provided on the common electrode 5, the common electrode 5 includes two body portion 12 and three first connecting portions 13 which are provided between adjacent body portions 12 and electronically connects adjacent body portions 12, the first slit 9 is provided between adjacent body portions 12, and two first connecting portions 13 are located at two ends of the body portions respectively.

The above is only one implementation of the embodiments of the present disclosure. The common electrode may include multiple body potions, as long as the first connecting portions is provided between adjacent body portions and electronically connects body portions as a whole. The embodiments of the present disclosure may be implemented as follows: the first electrode is the pixel electrode, and the second electrode is the common electrode.

In an embodiment of the present disclosure, the first slit includes a first side in the direction in which the data line extends, and an edge of the branch electrode of the second electrode nearer to the first side is referred to as a first edge, with the distance between the first edge and the first side being greater than or equal to 3 μm. As shown in FIG. 2, the first slit 9 includes a first side 16 in the direction in which the data line extends, and an edge of the branch electrode of the second electrode nearer to the first side is referred to as a first edge 17, with the distance 18 between the first edge 17 and the first side 16 being greater than or equal to 3 μm. That is, the distance between the edge 16 of the body portion of the common electrode and the edge 17 of the branch electrode of the second electrode nearer to the first side of the body portion of the common electrode is greater than or equal to 3 μm.

A display panel is further provided in an embodiment of the present disclosure. The display panel includes an array substrate and an opposite substrate provided to be opposite to the array substrate, where a plurality of gate lines and a plurality of data lines are provided on the array substrate, and the plurality of gate lines and the plurality of data lines are intersected and insulated from each other to define a plurality of pixel units, each of the plurality of pixel units comprises a first electrode and a second electrode, with the second electrode having at least one branch electrode, and the first electrode having at least one first slit provided between the pixel units in a direction in which the data line extends; and a black matrix is provided on the opposite substrate, where an opening area surrounded by the surrounding black matrix has an one-to-one correspondence with the pixel unit, and the black matrix and a vertically projection area of the first slit on the black matrix are at least partially overlapped. The array substrate includes the array substrate described in the above embodiments.

Figure 6:
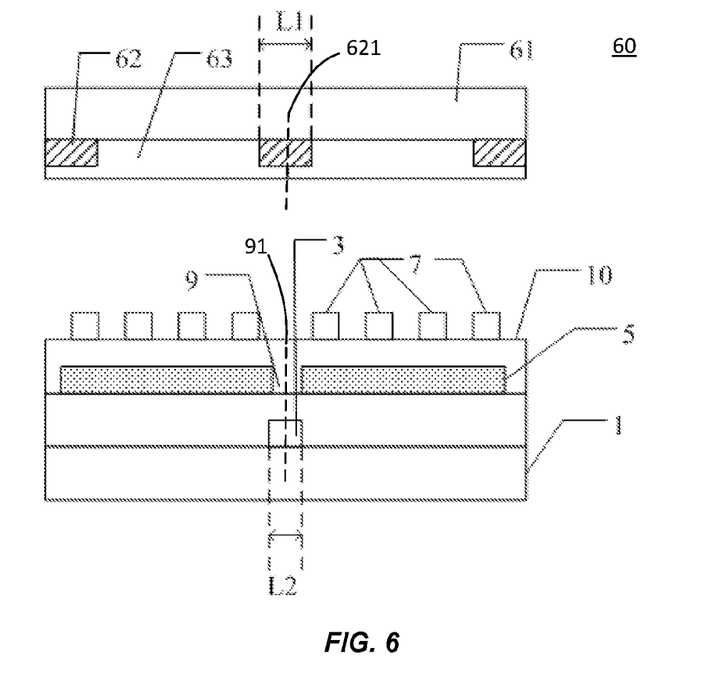
FIG. 6 is a simplified cross-sectional view of a display panel according to an embodiment of the present invention.
Figure 7:
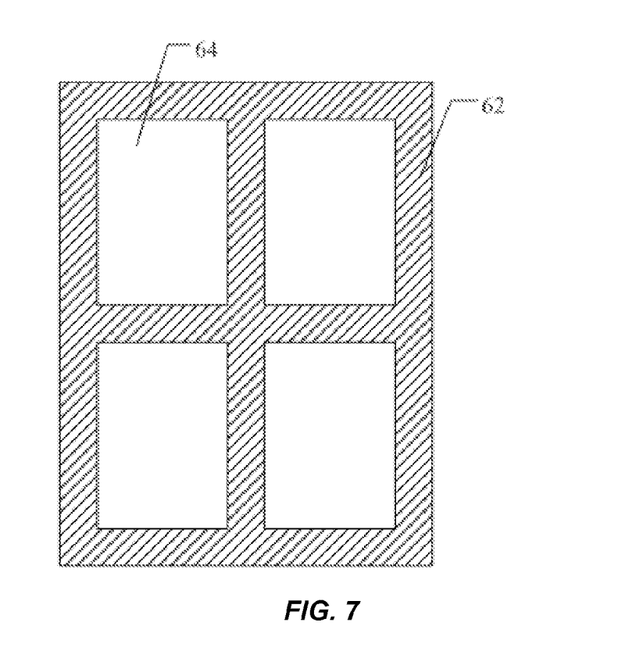
FIG. 7 is a simplified plan view of a black matrix according to an embodiment of the present invention.

As shown in FIG. 6, the display panel 60 includes an array substrate 1 and an opposite substrate 61 provided to be opposite to the array substrate, where a plurality of gate lines (not shown) and a plurality of data lines 3 are provided on the array substrate 1, and the plurality of gate lines and the plurality of data lines intersect each other and are insulated from each other to define a plurality of pixel units, each of the plurality of pixel units includes a first electrode 5 and a second electrode 6, with the second electrode 6 having at least one branch electrode 7, and the first electrode 5 having at least one first slit 9 provided between the pixel units in a direction in which the data line extends; and a black matrix 62 is provided on the opposite substrate, a color blocking layer 63 is provided above the black matrix 62. As shown in FIG. 7, an opening area 64 is surrounded by the black matrix 62, where the opening area 64 has a one-to-one correspondence with the pixel unit, the black matrix 62 and a vertically projection area of the first slit 9 on the black matrix 62 overlap at least partially, and the color blocking layer 63 covers the opening area 64. The color blocking layer may be a red color blocking layer, a green color blocking layer, a blue color blocking layer, a yellow color blocking layer or a white color blocking layer.

As can be seen from FIG. 6, the width L1 of the black matrix is greater than the width L2 of the first slit. Further, the width L of the black matrix is less than or equal to 10 μm. Preferably, the width L1 of the black matrix and the width L2 of the first slit meet the condition where L2 is less than or equal to L1−2 μm.

As can be seen from FIG. 6, a center line 621 of the black matrix extending in the direction of the data lines coincides with a center line 91 of the first slit. The above is only an implementation of the embodiments of the present disclosure. The center line of the black matrix may not coincide with the center line of the first slit, as long as the width of the black matrix is greater than the width of the first slit.

According to the embodiments of the present disclosure, the alignment deviation between the array substrate and the opposite substrate ranges from zero to 3 μm. The first electrode under the black matrix, which is the common electrode or the pixel electrode, is removed completely by grooving to reduce the electric field strength under the black matrix, thereby reducing the extent to which liquid crystal molecules are rotated and the transmittance in any oblique direction, and reducing color blending shift induced by local alignment deviation caused by a large viewing angle or compression. Taking in-plane switching (IPS) liquid crystal display as an example, the transmittance of the IPS liquid crystal display may be calculated by using the following equation:

$$T=\tfrac{1}{2}\sin^2(2\Psi)\sin^2(\pi\Delta nd/\lambda)$$

where the transmittance T reaches a maximum value when the liquid crystal molecule rotation angle Phi (Ψ) equals to 45° and reaches a minimum value when the liquid crystal molecule rotation angle Phi (Ψ) equals to 0°, the transmittance T decreases with the decrease of Phi when the liquid crystal molecule rotation angle Phi (Ψ) is less than 45°; therefore, in any oblique direction, the transmittance in any oblique direction decreases with the decrease of the angle by which liquid crystal molecules under the black matrix are rotated, and the intensity of the light through adjacent pixels decreases, thereby reducing color blending.

Given that the width of the black matrix is 5.5 μm, the width of the data line is 3.8 μm, the distance 18 between the first edge 17 and the first side 16 is 3.4 μm, a emulation test is performed on two liquid crystal display which have identical parameters except that one liquid crystal display has the first slit provided on the first electrode, and the other has no first slit provided on the first electrode. Two adjacent pixel units are taken as an example, the pixel unit at the left side of the liquid crystal display with no first slit is a sample 1, and the pixel unit at its right side is a sample 2; and the pixel unit at the left side of the liquid crystal display provided with first slit is a sample 3, and the pixel unit at its right side is a sample 4, where the first slit is provided between the sample 3 and the sample 4. The influence of the rotation of the liquid crystal molecule in the pixel unit of each of the two liquid crystal displays on light transmittance are tested when the alignment deviation MA is 0, −1.5, and +1.5 respectively to obtain the influence of the rotation of the liquid crystal molecule on the color blending shift, where Theta is indicative of the rotation of the liquid crystal molecule in the vertical direction, and Phi is indicative of the rotation of the liquid crystal molecule in the horizontal direction. If the extent to which the liquid crystal molecule is rotated is less, the transmittance in any oblique direction is lower, and the compression induced color shift is less likely to occur.

Figure 8A:
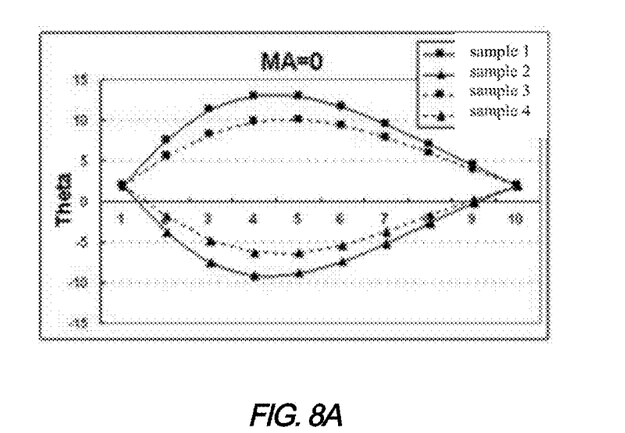
FIG. 8A is a graph illustrating simulation test results of the Theta angle of a liquid crystal molecule when alignment deviation is 0 according to an embodiment of the present disclosure.
Figure 8B:
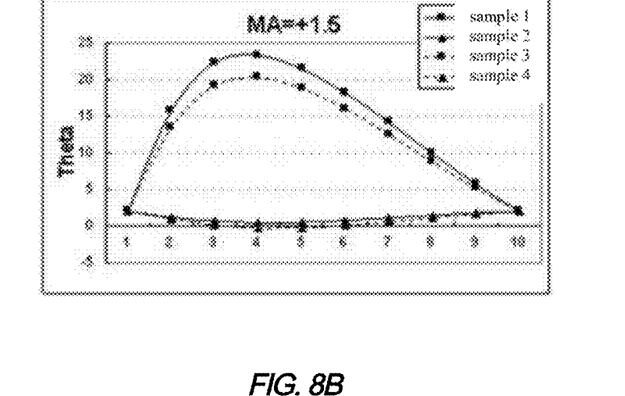
FIG. 8B is a graph illustrating simulation test results of the Theta angle of a liquid crystal molecule when alignment deviation is +1.5 according to an embodiment of the present disclosure.
Figure 8C:
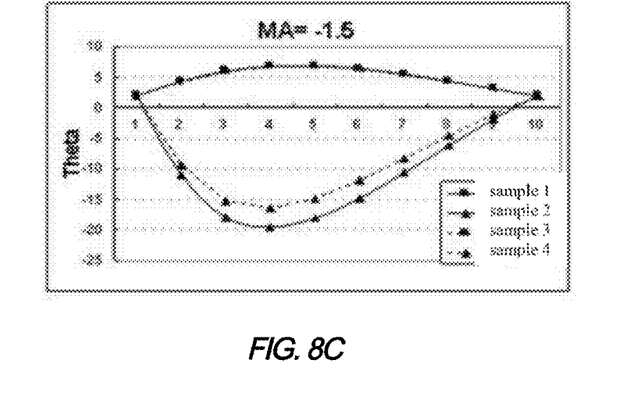
FIG. 8C is a graph illustrating simulation test results of the Theta angle of a liquid crystal molecule when alignment deviation is −1.5 according to an embodiment of the present disclosure.

FIG. 8A is a graph illustrating simulation test results of Theta angle of the liquid crystal molecule when alignment deviation is 0 according to an embodiment of the present disclosure; FIG. 8B is a graph illustrating simulation test results of Theta angle of the liquid crystal molecule when alignment deviation is +1.5 according to an embodiment of the present disclosure; and FIG. 8C is a graph illustrating simulation test results of Theta angle of the liquid crystal molecule when alignment deviation is −1.5 according to an embodiment of the present disclosure. The positive and negative alignment deviation represents the direction rather than the magnitude of the alignment deviation. The Y-axis in FIG. 8A, FIG. 8B and FIG. 8C is the angle by which the liquid crystal molecule is rotated, and negative and positive represents the direction in which the liquid crystal molecule rotates. As can be seen from FIG. 8A, FIG. 8B and FIG. 8C, compared to the liquid crystal display where the first electrode is provided with no first slit, the Theta angle of the liquid crystal molecule in the liquid crystal display where the first electrode under the black matrix is provided with the first slit is smaller, regardless of whether an alignment deviation exists, thereby the light transmittance of the liquid crystal display where the first electrode under the black matrix provided with the first slit is smaller.

Figure 9A:
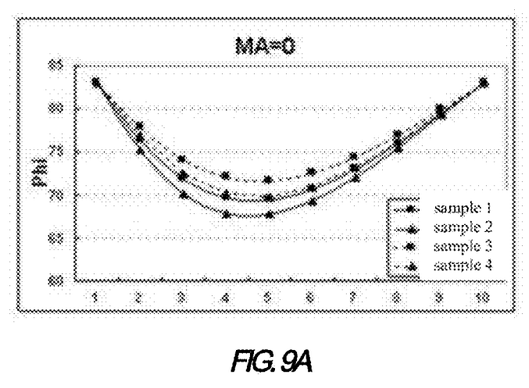
FIG. 9A is a graph illustrating simulation test results of the Phi angle of a liquid crystal molecule when alignment deviation is 0 according to an embodiment of the present disclosure.
Figure 9B:
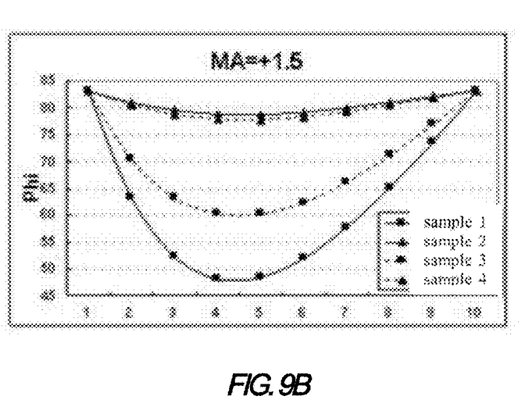
FIG. 9B is a graph illustrating simulation test results of the Phi angle of a liquid crystal molecule when alignment deviation is +1.5 according to an embodiment of the present disclosure.
Figure 9C:
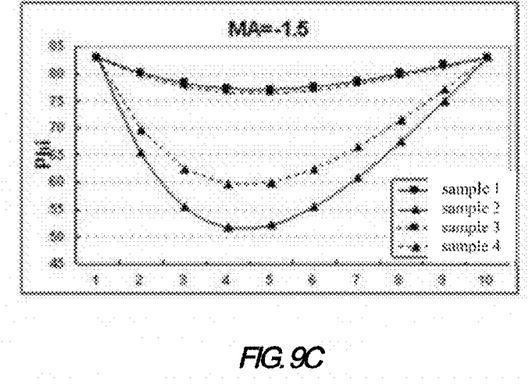
FIG. 9C is a graph illustrating simulation test results of the Phi angle of a liquid crystal molecule when alignment deviation is −1.5 according to an embodiment of the present disclosure.

FIG. 9A is a graph illustrating simulation test results of the Phi angle of the liquid crystal molecule when alignment deviation is 0 according to an embodiment of the present disclosure; FIG. 9B is a graph illustrating simulation test results of the Phi angle of the liquid crystal molecule when alignment deviation is +1.5 according to an embodiment of the present disclosure; and FIG. 9C is a graph illustrating simulation test results of Phi angle of the liquid crystal molecule when alignment deviation is −1.5 according to an embodiment of the present disclosure. The positive and negative alignment deviation represents the direction rather than the magnitude of the alignment deviation. The Y-axis in FIG. 9A, FIG. 9B and FIG. 9C indicates the angle in the horizontal direction by which the liquid crystal molecule is deflected. In the two tested displays, the initial Phi angle of liquid crystal molecule is 83°, and the actual rotating angle of the liquid crystal molecule in the horizontal direction equals to 83 degree minus the value indicated on the Y-axis. As can be seen from FIG. 9A, FIG. 9B and FIG. 9C, compared to the liquid crystal display where the first electrode is provided with no first slit, the Phi angle of the liquid crystal molecule in the liquid crystal display where the first electrode under the black matrix is provided with the first slit is smaller, regardless of whether an alignment deviation exists, that is, the actual deflecting angle in the horizontal direction of the liquid crystal molecule in the liquid crystal display where the first electrode under the black matrix provided with the first slit is smaller than the actual deflecting angle in the horizontal direction of the liquid crystal molecule in the liquid crystal display where the first electrode under the black matrix provided with no first slit, thereby the light transmittance is reduced. In summary, according to the embodiments of the present disclosure, the first slit is provided on the first electrode under the black matrix to reduce the electric field strength under the black matrix, thereby reducing significantly the rotating angle Phi and Theta of the liquid crystal molecule, and reducing the light transmittance and the color blending shift.

A display device is provided in an embodiment of the present disclosure, which includes the above-mentioned display panel.

In the array substrate, the display panel and the display device according to the embodiments of the present disclosure, the electrode under the black matrix is removed by hollowing out to reduce the electric field strength under the black matrix, thereby reducing the extent to which liquid crystal molecules are rotated and the transmittance in any oblique direction, and reducing effectively the color blending shift caused by the alignment deviation between the upper substrate and the lower substrate of the display panel.

Hereinbefore, the array substrate, the display panel and the display device provided according to the embodiments of the present disclosure are introduced in detail. Specific examples are used to explain the principle and the embodiment of the invention herein, the explanation of the above embodiments is only for understanding the method of the invention and the core idea thereof. Variations can be made to the specific embodiment and the application scope by those skilled in the art in accordance with the idea of the invention. In conclusion, the content of the specification should not be interpreted as to limit the invention.

What is claimed is:
1. An array substrate, comprising:
 a substrate;
 a plurality of gate lines and a plurality of data lines intersecting the gate lines and insulated from the gate lines; and a plurality of pixel units formed at the intersection between the gates lines and the data lines, the plurality of pixel units each comprising a first electrode and a second electrode that are laminated, wherein the first electrode is a pixel electrode and the second electrode is a common electrode, wherein the second electrode has at least one branch electrode, and wherein the first electrode has a first slit arranged between the pixel units, extending in a direction of the data lines, and wherein one of the plurality of data lines overlays the first slit partially.

2. The array substrate according to claim 1, wherein an insulation layer is disposed between the first electrode and the second electrode, and the first electrode is disposed between the insulation layer and the substrate.

3. The array substrate according to claim 1, wherein the first slit comprises a first side extending in the direction of the data lines, and wherein any side of the branch electrode of the second electrode is at least 3 μm away from the first side of the first slit of the first electrode.

4. A display panel, comprising an array substrate and a substrate opposite to the array substrate, the display panel comprising:
a plurality of gate lines and a plurality of data lines disposed on the array substrate, the gate lines and the data lines intersecting each other and insulated from each other;
a plurality of pixel units formed at the intersections each comprising a first electrode and a second electrode which are laminated, wherein the first electrode is a pixel electrode and the second electrode is a common electrode, wherein the second electrode has at least one branch electrode, and wherein the first electrode has a first slit arranged between the pixel units and extending in a direction of the data lines, wherein one of the plurality of data lines overlays the first slit partially; and
a black matrix having open areas and black matrix frames disposed on the substrate opposite to the array substrate, wherein the opening areas each in the black matrix has a one-to-one correspondence with one of the plurality of pixel units, and wherein the black matrix overlays the first slit partially.

5. The display panel according to claim 4, wherein a width of the black matrix frame is defined as L1 and a width of the first slit is defined as L2, L1 is greater than or equal to L2.

6. The display panel according to claim 5, wherein the width of the black matrix frame L1 is less than or equal to 10 μm.

7. The display panel according to claim 4, wherein a width of the black matrix frame is defined as L1 and a width of the first slit is defined as L2, L2 is less than or equal to (L1−2 μm).

8. The display panel according to claim 4, wherein a center line of the black matrix extending in the direction of the data lines coincides with a center line of the first slit.

9. A display apparatus comprising a display panel, wherein the display panel comprises:
an array substrate and a substrate opposite to the array substrate;
a plurality of gate lines and a plurality of data lines on the array substrate, the gate lines and the data lines intersecting each other and insulated from each other;
a plurality of pixel units formed at the intersections, wherein the pixel units comprises a first electrode and a second electrode which are laminated, wherein the first electrode is a pixel electrode and the second electrode is a common electrode, wherein the second electrode has at least one branch electrode, and wherein the first electrode has a first slit disposed between the pixel units and extending in a direction of the data lines, wherein one of the plurality of data lines overlays the first slit partially; and
a black matrix having open areas and black frames on the substrate, wherein the open areas each has a one-to-one correspondence with one of the plurality of pixel units, and wherein one of the plurality of data lines overlays the first slit partially.

* * * * *